EBERLY & WECHTER.
Horse Hay Fork.
No. 92,434.          Patented July 13, 1869.
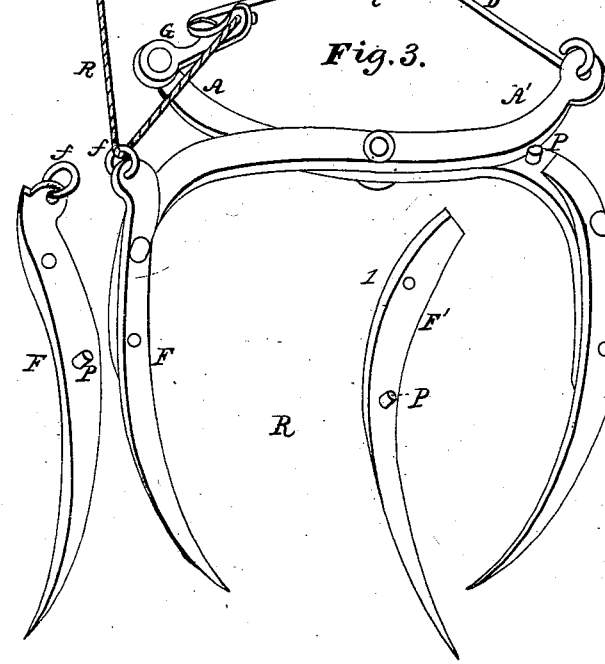

United States Patent Office.

JOHN A. EBERLY AND HENRY WECHTER, OF REAMSTOWN STATION, PENNSYLVANIA.

Letters Patent No. 92,434, dated July 13, 1869.

IMPROVEMENT IN HORSE HAY-FORK.

The Schedule referred to in these Letters Patent and making part of the same.

*To all whom it may concern:*

Be it known that we, JOHN A. EBERLY and HENRY WECHTER, of Reamstown Station, in the county of Lancaster, and State of Pennsylvania, have invented a new and useful Arrangement in a Manure-Drag and Horse Hay-Fork Combined; and we do hereby declare that the following is a full, clear, and exact description of the construction and operation of the same, reference being had to the annexed drawing, making a part of this specification, in which—

Figure 1 shows the arrangement of the parts as a manure-drag.

Figure 2, one pair of the united tines detached.

Figure 3, an enlarged view of hay-hook arrangement.

Figure 4 shows the central portion, common to both uses, as well as the yoke and links. The single tines, catch, and a headed screw-bolt, cord, and pulley, also shown detached.

Figure 5, a diagram of the rope, cord, and pulleys.

The nature of our invention consists in the arrangement and combination of the parts, as well as in the peculiar device of the action of the cord and pulley, for discharging the hay, and for raising the hook over any obstruction, in returning it to the wagon for a fresh load, or drawing it over the hatchway for that purpose.

The drawing shows the several parts. A brief description will enable any one skilled in the art to make and use our invention.

The two arms A A', fig. 4, are united centrally by a pivot, as shown, being provided with eyes on the upper end for the link-and-hook connection D G.

The other end is provided with two holes, 1 2, for the headed screw-bolts, or the lower ones for the fixed pins P, on the single tines F F', fig. 3.

P also shows a fixed stop-pin, on the arm A.

For converting it into a manure-hook, the double tines B B' are attached by the headed screw-bolts, the link D connected to the eye of the arm A, and the hook or drag is ready, and is peculiar for grasping sideways, and will firmly hold and drag out all it can grasp, and can be readily disengaged with or without the aid of a lever.

For a hay-hook or horse hay-fork, it is only necessary to remove the united tines B, disengage the link D, and fit the fixed pins P on the single tines F F' into the lower holes 2 2. The hole in the tines 1 1 will match those in the arms, to receive the headed screw-bolt, secured by a nut, at the same time connecting the hook G, by a similar bolt, to the arm A of the cross-arms A A', as shown in fig. 3.

A ring, $f$, is shown on the tine.

The cord R is attached to the eye $g$, on the hook G, and carried down through the ring $f$, on the tine F; thence up over a pulley, O, fastened on one side to the rafters above, near one of the pulleys for the main hoisting-rope $s$.

From this pulley O, the cord R goes to the hand of the operator, and not only aids in discharging the load grasped by the machine, but also, in again raising the machine, and drawing it forward to be lowered to grasp a fresh load, which, without such an additional pulley, makes it necessary to have a hand to bring it to its proper place again in numerous cases.

The ordinary trippers, hooks, or shifting-levers, are not adapted to this arrangement, nor could they be used in the manner stated.

The great trouble in most barns is to get the hook vertically over the hatchway, after being carried to one side, more especially since the central pulley is always put on one side, so that the hay grasped will swing over to the side of the mow where it is to be lodged or discharged, the extra pulley placed so that by means of the cord, this difficulty is overcome, particularly when lodged behind the cross-timbers.

We are aware of the numerous horse hay-forks already patented, embracing numerous combinations of parts and claims; but we are not aware that our combined arrangement interferes with that of any among the number. We do not, however, claim any of the parts, separately considered, independent of the combined arrangement, either as a manure-drag or hay-fork. Therefore,

What we claim as our invention, is—

The arrangement and combination of the arms A A' with their respective hooks or combined tines F F' or B B', operated by the links and collar D D E, hook-arrangement G, and pulley O, all connected and operating substantially in the manner and for the purpose specified.

JOHN A. EBERLY.
HENRY WECHTER.

Witnesses:
J. G. LARMAN,
BY'AM FRANKHOUSER.